United States Patent [19]

Molteni et al.

[11] Patent Number: 4,960,876
[45] Date of Patent: Oct. 2, 1990

[54] MODIFIED GALACTOMANNANS AND PROCESS FOR THEIR PREPARATION

[75] Inventors: Giuseppe Molteni; Carlo Nicora, both of Varese; Attilio Cesaro; Sabrina Pricl, both of Trieste, all of Italy

[73] Assignee: Fratelli Lamberti S.p.A., Italy

[21] Appl. No.: 288,233

[22] Filed: Dec. 22, 1988

[30] Foreign Application Priority Data

Dec. 29, 1987 [IT] Italy ............................... 23244 A/87

[51] Int. Cl.$^5$ .................... C07G 17/00; C08B 37/00; C07H 15/00
[52] U.S. Cl. .................................. 536/114; 536/124; 536/120
[58] Field of Search .................. 536/114, 124, 120, 84, 536/90, 91, 95, 96, 97, 99, 100

[56] References Cited

U.S. PATENT DOCUMENTS

| | | | |
|---|---|---|---|
| 4,169,945 | 10/1979 | DeGuia et al. | 536/114 |
| 4,447,337 | 5/1984 | Adl et al. | 536/114 |
| 4,540,778 | 9/1985 | Tessler et al. | 536/114 |
| 4,549,907 | 10/1985 | Kohn | 536/114 |
| 4,605,736 | 8/1986 | Morgan | 536/114 |
| 4,663,159 | 5/1987 | Brode, II et al. | 536/43 |

*Primary Examiner*—Ronald W. Griffin
*Assistant Examiner*—Everett White
*Attorney, Agent, or Firm*—Arnold, White & Durkee

[57] ABSTRACT

Modified galactomannans are described having a total molar substitution exceeding 0.7 and containing an average of between 0.7 and 4 hydrophilic substituents and between 0.0001 and 0.02 hydrophobic substituents per anhydroglycosidic unit, the molar ratio of hydrophilic to hydrophobic substituents being between 35:1 and 40,000:1.

A process for their preparation is also described.

When dissolved in water, the compounds of the invention have the property of modifying the rheological properties of aqueous solutions by increasing their viscosity and their suspending properties, thus making them particularly suitable for industrial use in the paint, paper, and ceramic production sectors and as printing aids in the textile field, as aids in the preparation of fluids used in hydrocarbon research and production, and generally in any application in which such properties are required.

10 Claims, No Drawings

MODIFIED GALACTOMANNANS AND PROCESS FOR THEIR PREPARATION

A. TECHNICAL SECTOR

This invention relates to modified galactomannans having a total molar substitution exceeding 0.7 and containing an average of between 0.7 and 4 hydrophilic substituents and between 0.0001 and 0.02 hydrophobic substituents per anhydroglycosidic unit, the molar ratio of hydrophilic to hydrophobic substituents being between 35:1 and 40,000:1.

A process for their preparation is also described.

Galactomannans are polysaccharides composed mainly of galactose and mannose units. The main source of galactomannans is the endosperm of certain leguminous seeds such as guar, carob, tare, cassia obtusifolia and the like. In particular, the polysaccharide contained in guar seeds consists of a main chain of mannose units linked together by 1-4-$\beta$-glycosidic linkages from which single galactose units branch by means of 1-6-$\alpha$-glycosidic linkages. The ratio of galactose units to mannose units can vary from one source to another. In the case of the polysaccharide contained in guar seeds the ratio is about 1:2.

Galactomannans are soluble in water to give high-viscosity solutions. For example the guar polysaccharide in a 1 weight % concentration in water gives a solution with a viscosity of between 1000 and 5000 mPa.s at 25° C., when measured by a Brookfield RVT viscometer at 20 r.p.m.

This property makes them particularly useful in various sectors such as hydrocarbons research and production, textile printing, food, paper and pharmaceutics.

B. TECHNICAL PROBLEM

Of the many products used commercially for modifying the rheological characteristics of aqueous systems it is difficult to find one which combines good viscosity-enhancing with good suspending properties, especially if dissolved electrolytes are present.

There is therefore a continuous search for new products which possess this capacity to a commercially useful extent.

C. PRIOR ART

There is a vast series of water-soluble polymers used in numerous industrial applications for their viscosity-enhancing, suspending, water rententive, stabilizing or film forming properties.

The choice of a polymer is made on the basis of its performance and, if more than one product can satisfy industrial requirements, on the basis of its cost. This underlines the need for polymers capable of producing ever higher viscosities for equal concentration, so as to reduce the quantity used or improve their applicational properties.

The most well known water-soluble polymers are substantially of three categories:

Natural: cellulose ethers (methyl-, hydroxyethyl-, hydroxypropyl-, carboxymethyl-cellulose etc.); starch and its derivatives (hydroxyethyl-, hydroxypropyl-, carboxymethyl-starch, degraded starch, cationic starch, esterified starch etc.); guar polysaccharides and their derivatives (hydroxyethyl-, hydroxypropyl-, carboxymethyl-guar, depolymerized guar, cationic guar, etc.).

Synthetic: polyacrylic acid, polyacrylamide, polyvinyl alcohol, polyvinylpyrrolidone etc.

Biopolymers: xanthan gum, dextran.

All the aforesaid polymers bestow specific characteristics on their aqueous solutions. The common effect is however to increase the solution viscosity. In many cases however a viscosity increase is not sufficient to attain the required effect. For example, in processes where the suspension of insoluble solids is required, polymers must be used in aqueous solutions which not only have high viscosity but also high yield points to prevent the suspended solids from sedimenting under static conditions.

The main products possessing these characteristics are xanthan gum, crosslinked polyacrylic acid and, to a lesser extent, methyl-, hydroxyethyl- and carboxymethyl-cellulose of very high molecular weight.

In the present text, the term "yield point" means the value which the shear force applied to an aqueous polymer solution assumes when the shear rate measured by a coaxial cylinder viscometer returns to 0 sec$^{-1}$ after being raised from 0 sec$^{-1}$ to a maximum value of 700 sec$^{-1}$.

The term "degree of substitution" means the average number of hydroxyl groups substituted for every galactomannan anhydroglycosidic unit.

The term "molar substitution" (MS) means the average number of moles of substituents for each anhydroglycosidic unit of the galactomannan.

The aforesaid, known polysaccharide derivatives of guar include alkyl ethers of galactomannans with a degree of substitution of between 0.01 and 1 (if the degree of substitution exceeds 1 they become insoluble in water) and an alkyl chain length of between 1 and 20 carbon atoms, as described in U.S. Pat. No. 4,169,945.

Aqueous solutions of these products are more stable to heat and to the presence of electrolytes than corresponding solutions of the non-modified products, but do not show substantial variations in the viscosity of the aqueous solutions.

The UK Patent No. 1,242,735 describes natural polysaccharides, particularly cellulose, dextran, dextrines, starch, modified through the insertion in the anhydroglycosidic unit of the hydrophilic groups such as hydroxyethyl, hydroxypropyl, hydroxybutyl, carboxyl, sulphonic and amino, or hydrophobic groups such as linear alkyl chains having a length of between 3 and 30 carbon atoms. These products are insoluble in water and are useful as chromatographic supports for gel/liquid chromatography in organic solvents, and therefore are not useful in modifying the rheological characteristics of aqueous solutions.

D. DETAILED DESCRIPTION OF THE INVENTION

It has now been unexpectedly found that the simultaneous presence of hydrophobic and hydrophilic substituents in a galactomannan substantially modifies the rheological behavior of the aqueous solutions to which it is added.

In particular, the viscosity of aqueous solutions with low concentrations of the products according to the invention is higher than that of any other natural product of the aforesaid list, including galactomannans themselves, and galactomannan derivatives containing only one type of substituent.

A further rheological property of the aqueous solutions of the products according to the invention which is improved to an exceptional degree compared with the aforesaid natural polymers is their yield point.

Said results were totally unexpected, both with regard to their extent and because they occur only if the hydrophilic molar substitution of the galactomannans anhydroglycosidic unit exceeds 0.7 and if the molar ratio of hydrophilic to hydrophobic substituents is controlled to between 35:1 and 40,000:1.

Outside this range the modifications to the rheological properties of the aqueous solutions are of little significance.

According to one basic characteristic of the invention the modified galactomannans have a total molar substitution exceeding 0.7 and contain an average of between 0.7 and 4 hydrophilic substituents and between 0.0001 and 0.02 hydrophobic substituents per anhydroglycosidic unit, the molar ratio of hydrophilic substituents to hydrophobic substituents being between 35:1 and 40,000:1.

In the typical embodiments of the invention the hydrophilic substituents are chosen from the group consisting of hydroxyethyl, hydroxypropyl, hydroxybutyl, carboxymethyl, carboxyl and amino substituents. The hydrophobic substituents are chosen from the group consisting of linear or branched chain alkyl and/or alkenyl substituents of between 10 and 32 carbon atoms, either alone or mixed together.

In the preferred embodiments of the invention the modified galactomannans have a total molar substitution from 0.9 up to 2.01 and contain between 0.9 and 2 hydrophilic substituents and between 0.0005 and 0.01 hydrophobic substituents per anhydroglycosidic unit, the molar ratio of hydrophilic substituents to hydrophobic substituents being between 90:1 and 4000:1.

In the most preferred embodiments of the invention the hydrophilic substituent is hydroxypropyl and the hydrophobic substituent is a linear chain alkyl containing between 18 and 28 carbon atoms or a mixture of such alkyls.

The compounds of the present invention have many advantages over those commercially known and in particular:

1. they allow particularly high viscosities to be obtained in aqueous solution at relatively low concentrations, and in fact higher viscosities than those obtainable with unmodified hydroxypropylguar or with any other galactomannan;

2. they compare positively with synthetic thickeners with regard to electrolyte tolerance;

3. they have good suspending properties for water-suspended materials compared with hydroxypropyl-guar and with other suspension-stabilizing agents having high performance but limited by high cost (such as xanthan gum) or by poor electrolyte tolerance (crosslinked synthetic polymers).

According to a basic characteristic of the present invention, the process for preparing modified galactomannans having a total molar substitution exceeding 0.7 and containing an average of between 0.7 and 4 hydrophilic substituents and between 0.0001 and 0.02 hydrophobic substituents per anhydroglycosidic unit comprises the hydrophobic modification of a commercially available hydrophilic galactomannan derivative having a molar substitution exceeding 0.7. This type of product is available commercially for example under the name of Esacol from Fratelli Lamberti S.p.A.

According to a basic characteristic of the present invention the hydrophilic and hydrophobic modifications can be carried out in succession starting from galactomannan either as such or monosubstituted or only partly substituted, without isolating the intermediate product. It is also possible to proceed by carrying out the two hydrophilic and hydrophobic modifications simultaneously on the same galactomannan, either as such or only partly substituted.

In all cases the starting polysaccharides for obtaining the modified galactomannans of the invention have a molecular weight typically of between 50,000 and 1,600,000 depending on the polysaccharide origin.

Of the reactants suitable for the hydrophilization reaction according to the present invention, the following have been found particularly useful: ethylene oxide, propylene oxide, monochloroacetic acid and its salts, and 1-chloro-2-hydroxy-3-trimethyl-amino-propane hydrochloride; whereas those useful for the hydrophobization reaction include epoxy-alkanes and/or alkenes, alkyl- and/or alkenyl-glycidylethers, alkyl- and/or alkenyl-$\beta$-hydroxy-$\gamma$-chloropropyl ethers, alkyl- and/or alkenylisocyanates, alkyl and/or alkenyl and/or acyl halides, and epoxidated triglycerides.

It is apparent that with the exception of the case in which the reactant is an alkyl and/or alkenyl halide, the hydrophobic substituent is not a simple alkyl and/or alkenyl radical. In effect, the substituent is a hydroxyalkyl and/or alkenyl in the case of epoxy-alkanes and/or alkenes; a urethane radical in the case of alkyl and/or alkenyl-isocyanates; a hydroxy-(oxa)-alkyl and/or alkenyl in the case of glycidyl ethers and $\beta$-hydroxy-$\gamma$-chloropropyl ethers; and an acyl radical in the case of acyl halides. Notwithstanding this, the use of the term "alkyl and/or alkenyl substituents" was preferred in that, as regards the properties of the compounds of the present invention, substantial differences have not been noted between one compound and another on varying the link between the alkyl and/or alkenyl chain and the glycosidic nucleus of the galactomannan.

In a preferred embodiment of the process according to the invention the double derivative is obtained using galactomannan as raw material and operating as follows: the galactomannan, possibly dispersed in an inert diluent in the form of lower aliphatic alcohols, ketones or liquid hydrocarbons, is treated at ambient temperature with an alkaline hydroxide in aqueous solution and is then reacted with one of the said hydrophilization reactants at a temperature of between 40° and 80° C. for a time of between 1 and 3 hours.

On termination of the reaction the system is cooled to 40° C. and the hydrophobizing agent is introduced into the reactor, possibly dispersed in an inert organic diluent, and the reaction is completed by raising the temperature to 50°–80° C. for 2–6 hours.

On termination of the reaction the alkaline hydroxide is neutralized, the product obtained is separated from the reaction mixture by filtration or distillation and is then dried and ground.

The product obtained is of technical type but perfectly suitable for the normal uses for which it is intended. If a particularly pure product is required for special uses the technical product is extracted with an organic or aqueous-organic solvent before the final drying so as to remove the salts and by-products formed during the reaction.

EXAMPLES 1-5

100 g of guar polysaccharide (viscosity by Brookfield RVT for 1% in water at 20° C. and 20 rpm=4000 mPa.s) are fed into a suitable steel reactor able to resist pressures of up to 10 atm, which is evacuated and filled three times with nitrogen and then mixed carefully with 6 g of sodium hydroxide dissolved in 34 g of water. After 15 minutes of stirring at 20° C., 50 g of propylene oxide are added and the mixture heated up to 70° C. over a period of 30 minutes. This temperature is maintained for 2 hours as the mixture is constantly stirred. The mixture is then cooled at 40° C. and the stated quantity of epoxyalkane dispersed in 50 ml of hot isoproponal.

The mixture is stirred until homogeneous and is then heated to 80° C. for the time stated in the following Table.

On termination of the reaction the reaction mixture is cooled to 40° C. and then discharged and dispersed in 1000 ml of acetone. It is neutralized with hydrochloric acid up to pH 7, the product filtered off under vacuum and dried in a hot air stream at 85°–90° C. for 15-20 minutes. A blank test in which the guar polysaccharide is subjected to the same process but without epoxyalkane, to evaluate any variation of the molecular weight of the starting product resulting from the treatment undergone.

The values obtained are as follows:

| Example | Epoxy alkane length | weight (a) | Time hours | MS (b) | Viscosity mPa.s (c) |
|---|---|---|---|---|---|
| Guar polysaccharide |  |  |  |  | 4,000 |
| Blank |  |  | 6 |  | 320 |
| 1 | $C_{24-28}$ | 4.3 | 6 | 0.0024 | 8,500 |
| 2 | " | 5.4 | 3 | 0.0019 | 6,800 |
| 3 | " | 5.4 | 6 | 0.0032 | 11,200 |
| 4 | " | 6.4 | 6 | 0.0041 | 8,500 |
| 5 | " | 10.8 | 6 | 0.0091 | 100 |

(a) quantity of added epoxyalkane by weight
(b) molar substitution of epoxyalkane
(c) viscosity measured by Brookfield RVT viscometer for 1% by weight at 20 rpm and 20° C.

EXAMPLES 6-7

100 g of guar polysaccharide having the same characteristics as that used in the previous examples are fed into a suitable steel reactor able to resist 10 atm, which is evacuated and filled 3 times with nitrogen, and then mixed homogeneously with 6 g of sodium hydroxide dissolved in 34 g of water. After 15 minutes of stirring at 20° C., the stated quantity of epoxyalkane dispersed in 50 ml of hot isopropanol is added. The mixture is stirred for an additional 15 minutes and 50 g of propylene oxide are added.

The mixture is heated to 70° C. over a period of about 30 minutes and this temperature is maintained for 4 hours. On termination of the reaction the reaction mixture is cooled to 40° C. and then discharged and dispersed in 1000 ml of acetone. It is neutralized with hydrochloric acid to pH 7, the product filtered off under vacuum and dried in a hot air stream at 85°–90° C. for 15-20 minutes.

| Example | Epoxy alkane length | weight (a) | Time hours | MS (b) | Viscosity mPa.s (c) |
|---|---|---|---|---|---|
| Guar polysaccharide |  |  |  |  | 4,000 |
| Blank |  |  | 4 |  | 900 |
| 6 | $C_{24-28}$ | 5.4 | 4 | 0.0018 | 4,100 |
| 7 | " | 10.8 | 4 | 0.0051 | 1,500 |

(a) quantity of added epoxyalkane by weight
(b) molar substitution of epoxyalkane
(c) viscosity measured by Brookfield RVT viscometer for 1% by weight at 20 rpm and 20° C.

EXAMPLES 8-23

40 g of hydroxypropylguar (MS=1.0) marketed by Fratelli Lamberti S.p.A. under the trade mark ESACOL OR 18 are dispersed in 250 ml of isopropanol and evacuated and filled three times with nitrogen. 2.5 g of sodium hydroxide dissolved in 40 ml of water are added while the mixture is stirred and the mixture is stirred for 30 minutes at 20° C. The stated quantity of epoxyalkane is dispersed in 50 ml of hot isopropanol and added to the hydroxypropylguar dispersion. The system is heated to 80° C. for the time shown on the table. On termination of the reaction the system is cooled to 40° C. and neutralized with hydrochloric acid to pH 7. It is filtered under vacuum and the solid remaining on the filter is washed with 400 ml of acetone and then dried in a hot air stream at 85°–90° C. for 15-20 minutes.

A blank test was simultaneously carried out in which the hydroxypropylguar was subjected to the entire process but to which no epoxyalkane was added, to evaluate any variation of the molecular weight resulting from the treatment.

In this manner, galactomannans were obtained having the hydroxypropyl radical as the hydrophilic substituent and the hydrophobic substituent indicated in the following table.

| Example | Epoxy alkane length | weight (a) | Time hours | MS (b) | Viscosity mPa.s (c) |
|---|---|---|---|---|---|
| Hydroxypropyl-guar |  |  |  |  | 880 |
| Blank |  |  | 3 |  | 12 |
| 8 | $C_{24-28}$ | 0.65 | 3 | 0.0011 | 2,250 |
| 9 | " | 0.78 | 3 | 0.0014 | 3,870 |
| 10 | " | 0.98 | 3 | 0.0021 | 4,150 |
| 11 | " | 1.30 | 6 | 0.0029 | 7,200 |
| 12 | " | 1.60 | 3 | 0.0025 | 7,800 |
| 13 | " | 2.60 | 3 | 0.0031 | 11,000 |
| 14 | " | 2.60 | 6 | 0.0033 | 13,300 |
| 15 | " | 3.30 | 3 | 0.0053 | 1,075 |
| 16 | " | 5.00 | 3 | 0.0058 | 1,000 |
| 17 | " | 5.00 | 6 | 0.0071 | 850 |
| 18 | $C_{18}$ | 1.82 | 3 | 0.0025 | 925 |
| 19 | " | 2.28 | 3 | 0.0037 | 1,200 |
| 20 | " | 3.64 | 3 | 0.0065 | 1,500 |
| 21 | " | 3.64 | 6 | 0.0095 | 4,700 |
| 22 | $C_{12}$ | 3.64 | 3 | 0.0090 | 700 |
| 23 | " | 3.64 | 6 | 0.0012 | 200 |

(a) quantity of added epoxyalkane by weight
(b) molar substitution of epoxyalkane
(c) viscosity measurad by Brookfield RVT viscometer for 1% by weight at 20 rpm and 20° C.

EXAMPLE 24

Example 21 was repeated using an equal quantity of octadecylglycidylether instead of the epoxyoctadecane. The product obtained had a viscosity of 5200 mPa.s and an MS of 0.014.

EXAMPLES 25-27

Examples 11, 14 and 17 were repeated using hydroxypropylcarob having viscosity of 600 mPa.s measured by a Brookfield RVT for a 1% solution at 20° C. and 20 rpm, and an MS of 1.0 instead of the hydroxypropylguar.

The results obtained are as follows:

| Example | Epoxy alkane length | weight (a) | Time hours | MS (b) | Viscosity mPa.s (c) |
|---|---|---|---|---|---|
| Blank | — | — | 3 | | 85 |
| 25 | $C_{24-28}$ | 1.3 | | 0.0027 | 4,500 |
| 26 | " | 2.6 | 6 | 0.0031 | 8,700 |
| 27 | " | 5.0 | 6 | 0.0065 | 820 |

(a) quantity of added epoxyalkane by weight
(b) molar substitution of epoxyalkane
(c) viscosity measured by Brookfield RVT viscometer for 1% by weight at 20 rpm and 20° C.

EXAMPLES 28-30

Examples 13, 14 and 17 were repeated using a hydroxypropylguar of MS 0.7 and a viscosity of 1800 mPa.s measured by a Brookfield RVT for a 1% solution at 20° C. and 20 rpm, instead of the hydroxypropylguar of MS 1.0.

The results obtained are as follows:

| Example | Epoxy alkane length | weight (a) | Time hours | MS (b) | Viscosity mPa.s (c) |
|---|---|---|---|---|---|
| Hydroxypropylguar | — | — | — | | 1,800 |
| Blank | — | — | 3 | | 950 |
| 28 | $C_{24-28}$ | 2.6 | 3 | 0.0028 | 1,650 |
| 29 | " | 2.6 | 6 | 0.0032 | 1,550 |
| 30 | " | 5 | 3 | 0.0056 | 3,250 |

(a) quantity of added epoxyalkane by weight
(b) molar substitution of epoxyalkane
(c) viscosity measured by Brookfield RVT viscometer for 1% by weight at 20 rpm and 20° C.

EXAMPLES 31-32

Examples 8 and 14 were repeated using a hydroxypropylguar of MS 0.4 and a viscosity of 2450 mPa.s measured by a Brookfield RVT for a 1% solution at 20° C. and 20 rpm, instead of the hydroxypropylguar of MS 1.0.

| Example | Epoxy alkane length | weight (a) | Time hours | MS (b) | Viscosity mPa.s (c) |
|---|---|---|---|---|---|
| Hydroxypropylguar | — | — | — | | 2,450 |
| Blank | — | — | 3 | | 900 |
| 31 | $C_{24-28}$ | 0.65 | 3 | 0.0012 | 1,230 |
| 32 | " | 2.6 | 6 | 0.0032 | 850 |

(a) quantity of added epoxyalkane by weight
(b) molar substitution of epoxyalkane
(c) viscosity measured by Brookfield RVT viscometer for 1% by weight at 20 rpm and 20° C.

EXAMPLE 33

Solutions of the products to be evaluated were prepared at a concentration of 0.48% both in distilled water and in distilled water containing 4% of sodium chloride.

The yield point was measured for the solutions using the Rotovisco Haake RV2 viscometer and varying the shear rate from 0 s$^{-1}$ to 700 s$^{-1}$ and then from 700 s$^{-1}$ to 0 s$^{-1}$.

The yield point is considered to be the shear force measured when the shear rate returns to 0 s$^{-1}$.

The values obtained are as follows:

| Compound used: | A (a) | B (b) |
|---|---|---|
| Hydroxypropylguar (Esacol OR 18) | 800 | 300 |
| Hydroxyethylcellulose (Cellobond 5000 T) | 1,500 | 1,100 |
| Carboxymethylcellulose (Carbocel F 30000) | 1,350 | 1,000 |
| Methylcellulose (Valocel 40000) | 1,300 | 700 |
| Compound of Example 3 | 4,700 | 4,200 |
| Compound of Example 14 | 4,200 | 3,900 |
| Xanthan gum (Rhodopol 23) | 4,000 | 4,100 |
| Hydroxypropylcellulose (Klucel) | 800 | 450 |
| Crosslinked polyacrylic acid (Carbopol 846) | 40,000 | <100 |

(a) yield point values in mPa in distilled water;
(b) yield point values in mPa in 4% sodium chloride solution;
(c) the commercial names given in parentheses are trademarks of the following companies:
F.lli Lamberti = Esacol and Carbocel
B.P. = Cellobond
Wolff = Valocel
Rhone-Poulenc = Rhodopol
Hercules = Klucel
Goodrich = Carbopol

EXAMPLE 34

0.28% polymer solutions are prepared in distilled water. 383 g of barite are weighed out having the following characteristics:

| Particle size distribution, moist: | |
|---|---|
| residue on 200 mesh AST | max 3% |
| residue on 325 mesh ASTM | min 5% |
| Specific gravity | min 4.2 |

The substances are mixed with 340 g of the prepared solutions to obtain a homogeneous dispersion.

This dispersion is poured into a 500 cc graduated cylinder and the sedimented solid volume is measured at various times.

A blank test is carried out in which the barite is dispersed in distilled water and the sediment allowed to precipitate. The sedimented solid volume measured in this test indicates the maximum sedimentation value, all the measurements made on the polymer solutions being expressed as a percentage of this blank test value.

The results are:

| Time (h) | A | B | C | D |
|---|---|---|---|---|
| 1 | 21 | 35 | 0 | 0 |
| 2 | 25 | 42 | 0 | 0 |
| 3 | 44 | 56 | 0 | 0 |
| 4 | 60 | 71 | 0 | 0 |
| 12 | 70 | 86 | 4 | 5 |
| 24 | 87 | 91 | 10 | 12 |
| 48 | 90 | 94 | 19 | 18 |

The aforesaid table shows the weight percentages of barite sedimented at the indicated times. The product used was hydroxypropylguar in column A, carboxymethylcellulose in column B, biopolymer in column C and the compound of Example 3 in column D.

EXAMPLE 35

Evaluation tests were carried out on the polymers in water paints, using the following formulation:

| | |
|---|---|
| Demineralized water | 32.5 g |
| 10% sodium hexametaphosphate solution | 1 g |
| Antifoaming agent (Defomex 1540) | 0.1 g |
| Dispersant (Reotan L) | 0.5 g |
| Ethylene glycol | 1 g |
| Polymer | 0.5 g |
| Titanium dioxide | 20 g |
| Crystalline calcium carbonate | 20 g |
| Talc | 7 g |
| Vinavil 0.3 V | 16 g |
| Coalescent (Lamtard 931) | 0.8 g |
| Antifermenting agent (Carbosan) | 0.2 g |

Defomex, Reotan, Lamtard and Carbosan are trade marks of F.lli Lamberti.

The polymers used for the tests were:
Compound obtained in Example 14
Carboxymethylcellulose
Hydroxyethylcellulose
Acrylic copolymer (marketed under the trade name REOVIS CR by Allied Colloid).

Flow resistance tests were carried out by spreading paint films over horizontal metal surface to different thicknesses (75–300 micrometers) and then placing the metal surface in a vertical position. In descending sequence, the compounds thus tested exhibited the following order of resistance:
(1) Compound of Example 14
(2) Acrylic copolymer
(3) Carboxymethylcellulose
(4) Hydroxyethylcellulose A splash-resistance test was also carried out on the paints prepared as stated heretofore.

The paints were spread on a vertical surface with a 4 cm diameter roller. Splashes were collected on a black panel placed horizontally under the area of application.

The paint prepared with the compound of Example 14 displayed the least number of splashes.

EXAMPLES 36–40

Using the procedure of Example 8, the reactions were carried out using $C_{22-24}$-alkyl-$\beta$-hydroxy-$\gamma$-chloropropylether as substituting agent.

The results obtained are as follows:

| Example | Substituent length | weight (a) | Time hours | MS (b) | Viscosity mPa.s (c) |
|---|---|---|---|---|---|
| 36 | $C_{22-24}$ | 0.3 | 6 | 0.0005 | 2,300 |
| 37 | $C_{22-24}$ | 0.5 | 6 | 0.0009 | 4,400 |
| 38 | $C_{22-24}$ | 0.7 | 6 | 0.0012 | 8,200 |
| 39 | $C_{22-24}$ | 0.9 | 6 | 0.0016 | 7,000 |
| 40 | $C_{22-24}$ | 1.1 | 6 | 0.002 | 3,100 |

(a) quantity of substituent by weight
(b) molar substitution
(c) viscosity measured by Brookfield RVT viscometer for 1% by weight at 20 rpm and 20° C.

We claim:

1. Modified galactomannans having a total molar substitution exceeding 0.7 and containing an average of between 0.7 and 4 hydrophilic substituents and between 0.0001 and 0.02 hydrophobic substituents per anhydroglycosidic unit, the molar ratio of said hydrophilic to said hydrophobic substituents being between 35:1 and 40,000:1.

2. Modified galactomannans as claimed in claim 1, wherein the hydrophilic substituents are selected from the group consisting of hydroxyethyl, hydroxypropyl, hydroxybutyl, carboxyl and amino substituents; the hydrophobic substituents being chosen from the group consisting of linear or branched chain alkyl or alkenyl radicals of between 10 and 32 carbon atoms, either alone or mixed together.

3. Modified galactomannans as claimed in claim 2, having a total molar substitution of between 0.9 and 2.01 and containing between 0.9 and 2 hydrophilic substituents and between 0.0005 and 0.01 hydrophobic substituents per anhydroglycosidic unit, the molar ratio of hydrophilic substituents to hydrophobic substituents being between 90:1 and 4000:1.

4. Modified galactomannans as claimed in claim 3, wherein the hydrophilic substituent is hydroxypropyl and the hydrophobic substituent is a linear-chain alkyl of between 18 and 28 carbon atoms or a mixture of such alkyls.

5. A process for preparing modified galactomannans having a total molar substitution exceeding 0.7 and containing an average of between 0.7 and 4 hydrophilic substituents and between 0.0001 and 0.02 hydrophobic substituents per anhydroglycosidic unit, comprising two stages, in the first of which (hydrophilic modification) an average of between 0.7 and 4 hydrophilic substituents are introduced for each anhydroglycosidic unit of a natural galactomannan or of a modified galactomannan containing less than 0.7 hydrophilic substituents per anhydroglycosidic unit, whereas in the second stage (hydrophobic modification) between 0.0001 and 0.02 hydrophobic substituents are introduced.

6. A process as claimed in claim 5, wherein the starting natural galactomannan is obtained from guar.

7. A process as claimed in claim 5, wherein the modified galactomannan containing less than 0.7 hydrophilic substituents per monomer unit is hydroxyethylguar, hydroxypropylguar, cationized guar or depolymerized guar.

8. A process as claimed in claim 5, wherein the first reaction stage is conducted at a temperature of between 40° and 80° C. for a time of between 1 and 6 hours, the galactomannan pretreated with an aqueous sodium hydroxide solution being reacted with a hydrophilizing reactant.

9. A process as claimed in claim 5, wherein the modified galactomannan containing between 0.7 and 4 hydrophilic substituents per anhydroglycosidic unit is dispersed in an organic solvent and treated with a hydrophobizing reactant for a time of between 2 and 6 hours at a temperature of between 50° and 80° C.

10. A process as claimed in claim 5, wherein the hydrophilic modification stage and the hydrophobic modification stage are effected simultaneously.

* * * * *